United States Patent [19]

Tressler

[11] Patent Number: 5,158,628

[45] Date of Patent: Oct. 27, 1992

[54] METHOD OF ATTACHING A WRAPAROUND SCREEN TO A VEHICLE BODY

[75] Inventor: Ronald F. Tressler, Coventry, United Kingdom

[73] Assignee: Rover Group Limited, United Kingdom

[21] Appl. No.: 604,565

[22] Filed: Oct. 26, 1990

[30] Foreign Application Priority Data

Oct. 31, 1989 [GB] United Kingdom ............... 8924460

[51] Int. Cl.⁵ ............................................. B60J 10/02
[52] U.S. Cl. ..................................... 156/108; 52/208; 52/397; 296/96.21; 296/201
[58] Field of Search ................. 156/106, 108; 52/208, 52/397, 717.1; 296/96.21, 201

[56] References Cited

U.S. PATENT DOCUMENTS

| | | | |
|---|---|---|---|
| 3,155,204 | 11/1964 | Campbell et al. | 156/108 X |
| 3,155,422 | 11/1964 | Campbell et al. | 52/397 X |
| 3,241,277 | 3/1966 | Coppock | 156/108 X |
| 4,909,869 | 3/1990 | Sakamoto et al. | 156/108 X |
| 4,933,032 | 6/1990 | Kunert | 156/108 |

Primary Examiner—Michael W. Ball
Assistant Examiner—Francis J. Lorin
Attorney, Agent, or Firm—Davis, Bujold & Streck

[57] ABSTRACT

The invention provides a method of attaching a wraparound glass screen to vehicle bodywork to avoid wiping of adhesive from mating faces during assembly. The method includes the steps of providing the screen with a surround having an adhesive-receiving face thereon and forming on a portion of the bodywork arranged to support the screen a face to mate with the adhesive receiving face such that the faces when mated lie at an included angle not less than 45° to a direction of assembly of screen to bodywork, applying adhesive to at least one of the said faces and offering up the screen to the bodywork in said direction of assembly to bond the screen to the bodywork. The invention also provides a screen for use in the above method.

3 Claims, 2 Drawing Sheets

DIRECTION OF ASSEMBLY

METHOD OF ATTACHING A WRAPAROUND SCREEN TO A VEHICLE BODY

BACKGROUND TO THE INVENTION

This invention relates to a method of attaching a wraparound screen to a vehicle body, and to a screen for use in said method.

In order to achieve glazing which is as near to flush with the surrounding bodywork as possible also to provide added structural rigidity to the vehicle, fixed vehicle windows or screens are now commonly bonded to the bodywork.

A Bonded-in screen can be bonded either directly to the bodywork or can be provided with only a very slim surround to absorb shock loadings.

Bonding normally takes place by applying a bead of adhesive to a periphery of the screen or to a flange of the bodywork surrounding an aperture to be covered by the screen and press fitting the screen into place and then allowing time for the adhesive to cure.

So long as the screen does not deviate too substantially from a planar sheet it may be fitted by simply offering it up to the aperture and pressing it against the flange. However, if the screen has a substantial wraparound, for example if a windscreen or rear window has wraparound portions which extend around 'corners' of the passenger compartment of the vehicle, the bead of adhesive attached to the wraparound portions of the screen will be liable to be wiped from its position of application during fitting. This will occur during the final stages of offering up the screen to the flange and will cause unwanted accumulations of the adhesive in some parts and removal thereof from other parts. Unevenness of and breaks in the bead of adhesive cause considerable difficulties when trying to obtain a weathertight seal around the screen, hence glazing by the bonding method for wraparound screens has not been a practical proposition up to now.

OBJECTS OF THE INVENTION

It is an object of the present invention to provide an improved method of bonding a wraparound glass screen to vehicle bodywork, and an improved screen for use in such a method.

SUMMARY OF THE INVENTION

According to a first aspect of the invention there is provided a method of attaching a wraparound screen to a vehicle body, the method including the steps of providing the screen with a surround having an adhesive-receiving face thereon and forming on a portion of the bodywork arranged to support the screen a face to mate with the adhesive receiving face such that the faces when mated lie at an included angle not less than 45° to a direction of assembly of screen to bodywork, applying adhesive to at least one of the said faces and offering up the screen to the bodywork in said direction of assembly to bond the screen to the bodywork.

By so arranging the faces in relation to the direction of assembly, undesirable wiping of adhesive during assembly from portions of the faces associated with wraparound portions of the screen is avoided and robotic assembly is facilitated.

According to a second aspect of the invention there is provided a screen for use in the above method.

Preferably the faces of the screen surround and bodywork are formed so that when mated they lie at an included angle not less than 50° to the direction of assembly of screen to bodywork and most preferably lie at an included angle not less than 55° to said direction further to decrease undesirable wiping of adhesive from the faces.

The adhesive-receiving face of the surround may be shaped to control the spreading of adhesive during assembly and may be formed with at least one barrier along an edge region of the face extending proud of a flat portion of the face. Preferably the face is formed with a barrier along each border of said flat portion in order to contain the adhesive between the barriers.

The step of applying the adhesive to at least one of the said faces may advantageously include measuring the volume of adhesive so applied so as substantially to fill the volume formed between the two faces as bounded by the barriers when the screen is attached to the bodywork.

Preferably the adhesive is applied to the adhesive-receiving face of the screen surround and may be so applied to extend from the said face in the direction of assembly a distance substantially equal to the distance across the face between the barriers, the bead desirably being triangular in form.

The portion of the bodywork arranged to support the screen may be a flange. The flange may extend into an aperture to be covered by the screen and may extend from a reveal which extends inwardly of the vehicle from surrounding bodywork.

BRIEF DESCRIPTION OF THE DRAWING

The present invention will now be described in greater detail by way of example with regard to a preferred embodiment thereof as illustrated in the accompanying drawing of which.

DETAILED DESCRIPTION OF PREFERRED EMBODIMENT

Figure 1:
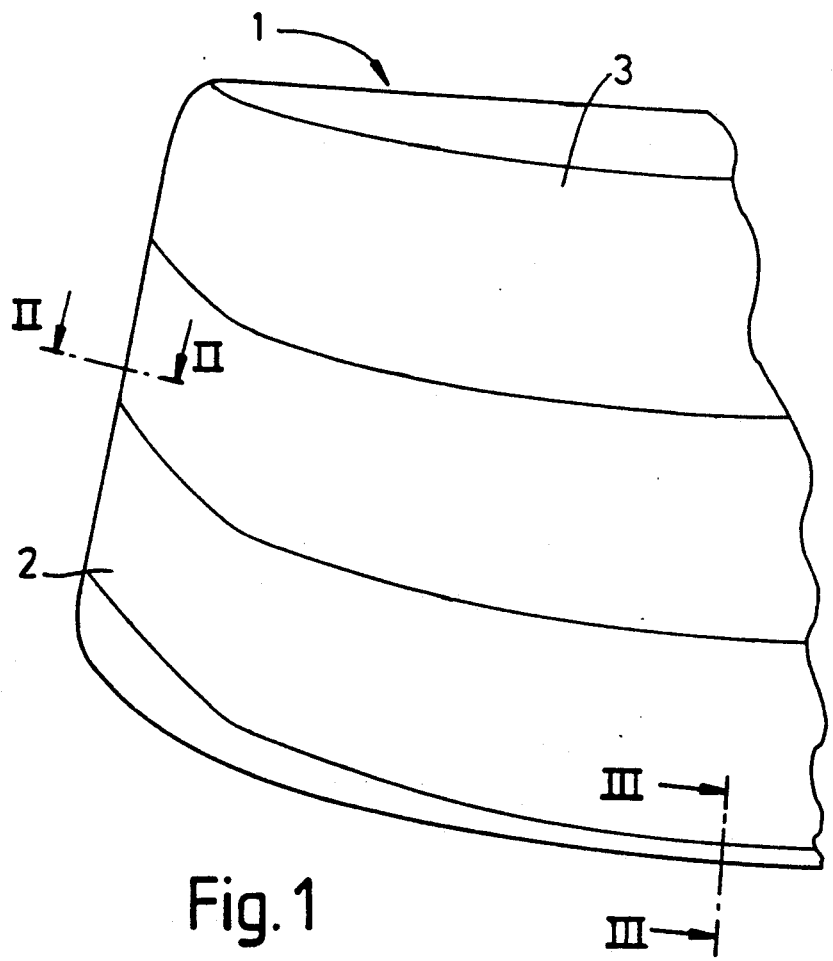
FIG. 1 is a schematic perspective detail view of a rear wraparound vehicle screen from behind and above.
Figure 2:
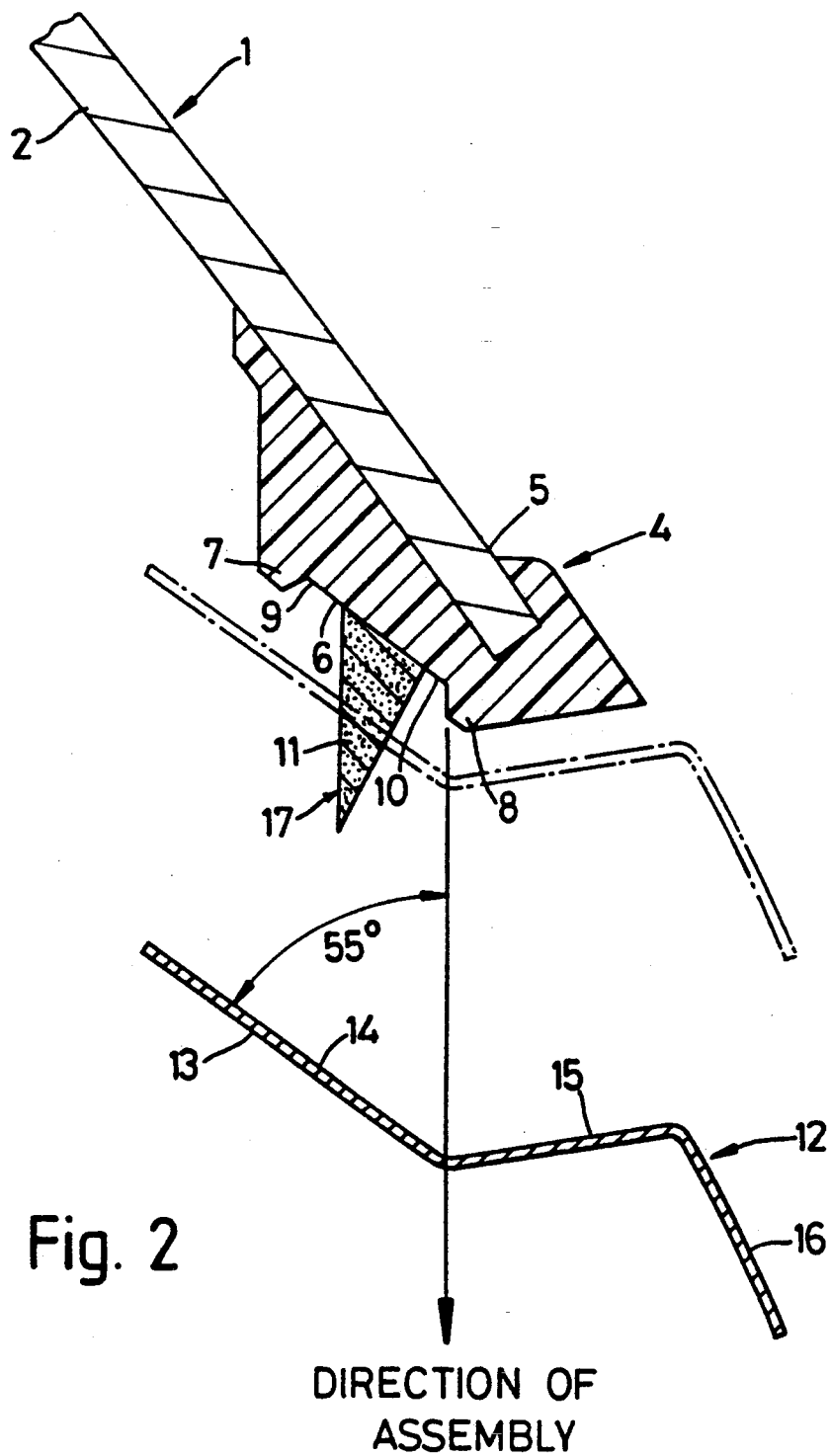
FIG. 2 is a section taken along the line II—II of FIG. 1, but also showing detail of the bodywork 'E' post.

Referring to FIGS. 1 and 2, a wraparound screen 1 has a wraparound portion 2 and a main portion 3. The direction of offering up or assembly of screen to bodywork is into the page.

The screen 1 has a surround 4 attached to a peripheral edge 5 thereof by moulding the surround in position around the peripheral edge. The surround 4 has an adhesive-receiving face 6 which carries adhesive barriers 7, 8 bordering edge regions 9, 10 of the face. The face 6 carries a bead 11 of adhesive which extends from the face 6 a distance substantially equal to the distance across the face between the barriers 7, 8 in triangular form.

Surrounding bodywork 12 of the vehicle is a flange 13 which has a face 14 to mate with the adhesive-receiving face 6. The faces 6 and 14 extend parallel with one another when mated with the screen attached to the bodywork and the flange 13 extends at an angle of 55° to the direction of assembly. The flange 13 extends from a window reveal 15 which extends inwardly of the vehicle from an external panel 16 of the surrounding bodywork 12. The bodywork is shown in two positions; the position shown in ghosted outline illustrating how the bead of adhesive 11 would be squashed by the flange 13 during offering up of screen to bodywork.

The volume of adhesive 11 used is measured substantially to fill the gap left between the two faces 6, 14 as bounded by the two carriers 7, 8. It will be seen that one face 17 of the bead of adhesive 11 extends substantially parallel to the direction of assembly of screen to bodywork. This alignment, in combination with the positioning of the bead on the face 6 ensures that the bead is compressed fully to occupy the above mentioned enclosed space, upon assembly.

It can further be seen that as the adhesive receiving face 6 extends at an angle to the surface of the wraparound portion 2 of the screen, the adhesive-receiving face is tilted further towards the direction of assembly than is the wraparound portion 2 of the screen. Wiping of the adhesive during assembly will thus be reduced to a level which is acceptable for robotic assembly of the screen to the bodywork.

Figure 3:
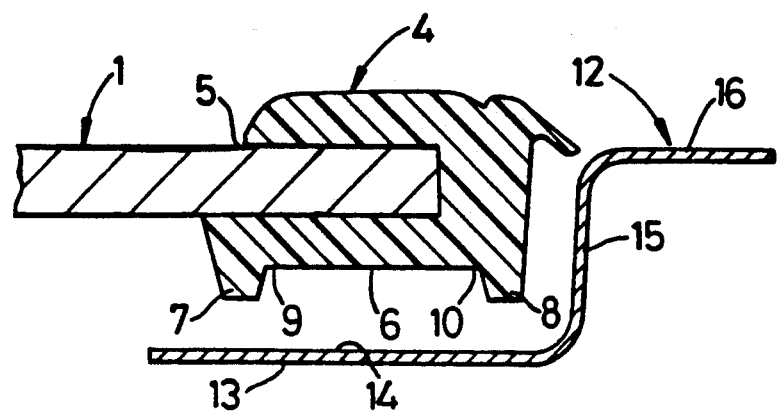
FIG. 3 is a section taken along the line III—III of FIG. 1, again showing bodywork detail.

FIG. 3 shows the components of FIG. 2 as they are arranged at the bottom of the screen 1. Equivalent components are given equivalent numbers to those used in FIG. 2. It will be seen that the flange 13 extends parallel with the external panel 16 in this region, also the adhesive-receiving face 6 extends parallel with the wraparound portion 2 of the screen. This arrangement is allowed owing to the direction of assembly of screen to bodywork at this position not promoting wiping of the adhesive between the faces 6 and 14.

From the above description it will be seen that the apparatus and method of this invention provides a simple and versatile solution to the problem of robotic glazing of wraparound screens. The required change in angle of the faces 6, 14 relative to the direction of assembly being achieved by a variation in shape of the moulded surround 4 and by a change in the relative angles of the flange and the bodywork external panel, respectively.

I claim:

1. A method of attaching a screen, having a main portion and a wraparound portion, to a vehicle body, the method including the steps of:

attaching a surround to a peripheral edge of the screen and providing the surround with an adhesive-receiving face thereon in which the adhesive-receiving face of the wraparound portion is angled with respect to the parallel faces of the screen's wraparound portion whereat the surround is attached while the adhesive-receiving face of the surround of the main portion is parallel to the parallel faces of the screen's main portion whereat the surround is attached;

forming on a portion of the vehicle body which is arranged to support the screen a face to mate with the adhesive-receiving face of the surround whereby the adhesive-receiving face of the surround is parallel to the adhesive-receiving face of the vehicle body when the screen is secured to the vehicle body;

applying adhesive to at least one of the adhesive-receiving faces, and offering up the screen to the vehicle body in a direction of assembly to bond the screen to the vehicle body such that the adhesive-receiving faces when mated lie at a first included angle of not less than 45° to the direction of assembly and the wraparound portion lies at a second included angle to the direction of assembly which is less than the first included angle.

2. A method of attaching a wraparound screen to a vehicle body as in claim 1, wherein the steps of providing the surround with an adhesive-receiving face thereon and forming on a portion of the vehicle body arranged to support the screen a face to mate with the adhesive-receiving faces of the main portion and the wraparound portion are carried out such that the adhesive-receiving faces when mated lie at an included angle of not less than 55° to the direction of assembly of the screen to the vehicle body.

3. A method of attaching a wraparound screen to a vehicle body as in claim 1, further comprising the step of applying the adhesive in triangular form to at least one of the adhesive-receiving faces such that at least one side of the triangular form of the adhesive extends generally parallel to the direction of assembly.

* * * * *